United States Patent
Ito et al.

(10) Patent No.: US 9,389,407 B2
(45) Date of Patent: Jul. 12, 2016

(54) MICROSCOPE SYSTEM AND MICROSCOPE FRAME

(75) Inventors: Madoka Ito, Hachioji (JP); Takahiko Kakemizu, Hachioji (JP); Yosuke Tani, Kokubunji (JP); Kazuhiro Kan, Kunitachi (JP)

(73) Assignee: OLYMPUS CORPORATION, Tokyo (JP)

(*) Notice: Subject to any disclaimer, the term of this patent is extended or adjusted under 35 U.S.C. 154(b) by 837 days.

(21) Appl. No.: 13/586,171

(22) Filed: Aug. 15, 2012

(65) Prior Publication Data

US 2013/0076887 A1 Mar. 28, 2013

(30) Foreign Application Priority Data

Sep. 27, 2011 (JP) ................... 2011-211635

(51) Int. Cl.
*H04N 13/02* (2006.01)
*G02B 21/36* (2006.01)
*G02B 25/00* (2006.01)
*G02B 21/04* (2006.01)
*G02B 21/00* (2006.01)

(52) U.S. Cl.
CPC ............. *G02B 21/362* (2013.01); *G02B 21/00* (2013.01); *G02B 21/04* (2013.01); *G02B 25/00* (2013.01)

(58) Field of Classification Search
CPC ......... G02B 21/00; G02B 21/04; G02B 25/00
USPC .............................. 348/79; 359/368, 656, 382
See application file for complete search history.

(56) References Cited

U.S. PATENT DOCUMENTS

| 5,071,241 A | 12/1991 | Brock | |
|---|---|---|---|
| 2005/0270638 A1* | 12/2005 | Soenksen | G02B 21/002 359/368 |
| 2007/0115543 A1* | 5/2007 | Nagasawa | A61B 5/0059 359/368 |
| 2008/0130103 A1* | 6/2008 | Hara | A61B 5/0059 359/369 |

FOREIGN PATENT DOCUMENTS

| JP | 51-34303 | 8/1976 |
|---|---|---|
| JP | 06160725 A | 6/1994 |
| JP | 09130664 A | 5/1997 |
| JP | 11287958 A | 10/1999 |
| JP | 2004302441 A | 10/2004 |
| JP | 2009216825 A | 9/2009 |

(Continued)

OTHER PUBLICATIONS

Japanese Office Action (and English translation thereof) dated Jun. 30, 2015, issued in counterpart Japanese Application No. 2011-211635.

(Continued)

*Primary Examiner* — Michael Lee
*Assistant Examiner* — Omer Khalid
(74) *Attorney, Agent, or Firm* — Holtz, Holtz & Volek PC

(57) ABSTRACT

A microscope system includes a microscope frame on which a stage is placed; and a camera head, in which an objective lens is attachable, for capturing an image of a specimen, the camera head being attached to the microscope frame by being fitted, and being slidable with respect to the microscope frame in a direction that is parallel with a surface of the stage placed on the microscope frame and orthogonal to an optical axis of the attached objective lens.

8 Claims, 12 Drawing Sheets

(56) References Cited

FOREIGN PATENT DOCUMENTS

| | | |
|---|---|---|
| JP | 2009282198 A | 12/2009 |
| JP | 2011027906 A | 2/2011 |

OTHER PUBLICATIONS

Japanese Office Action (and English translation thereof) dated Feb. 9, 2016, issued in counterpart Japanese Application No. 2011-211635.

* cited by examiner

MICROSCOPE SYSTEM AND MICROSCOPE FRAME

CROSS-REFERENCE TO RELATED APPLICATIONS

This application is based upon and claims the benefit of priority from Japanese Patent Application No. 2011-211635, filed on Sep. 27, 2011, the entire contents of which are incorporated herein by reference.

BACKGROUND OF THE INVENTION

1. Field of the Invention

The present invention relates to a microscope system that generates image data by capturing an image of a specimen for observation using light from the specimen and a microscope frame.

2. Description of the Related Art

As a type of a microscope used in observation of a specimen, an upright microscope and an inverted microscope have been known which have different positional relationship between an objective lens and a specimen. Since the upright microscope and the inverted microscope have different structures from each other, microscopes having a combination of functions of both microscopes have been little known.

Based on this circumstance, JP 51-34303 Y discloses a technique in which main units included in a microscope are divided into a plurality of structures by casings having polygonal boundary planes, and the structures are stacked in the manner that blocks are stacked so as to form a mirror body. According to the technique, an upright microscope or an inverted microscope can be freely configured if a user changes the way of stacking the units.

SUMMARY OF THE INVENTION

A microscope system according to the present invention generates image data for observation by condensing light from a specimen placed on a stage using an objective lens and capturing an image of the specimen with the condensed light and includes: a microscope frame on which the stage is placed; and a camera head, in which the objective lens is attachable, for capturing an image of the specimen, the camera head being attached to the microscope frame by being fitted, and being slidable with respect to the microscope frame in a direction that is parallel with a surface of the stage placed on the microscope frame and orthogonal to an optical axis of the attached objective lens.

A microscope frame according to the present invention, to which an objective lens is attached and a camera head for capturing an image of a specimen is attachable in a microscope system that generates image data for observation by condensing light from the specimen placed on a stage using the objective lens and capturing an image of the specimen with the condensed light, includes: an arm that is movable in a direction orthogonal to a surface of the stage; and a camera head holding section that is provided in the arm and holds the camera head, wherein the camera head holding section is fitted with the camera head such that the camera head is slidable in a direction that is parallel to the surface of the stage and orthogonal to an optical axis of the objective lens.

The above and other features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, embodiments for implementing the present invention (hereinafter, referred to as "embodiments") will be described with reference to accompanying drawings. Incidentally, the drawings referred in the below description are schematic, and when the same object is illustrated in different drawings, the dimensions, the scale, and the like may differ.

First Embodiment

Figure 1:
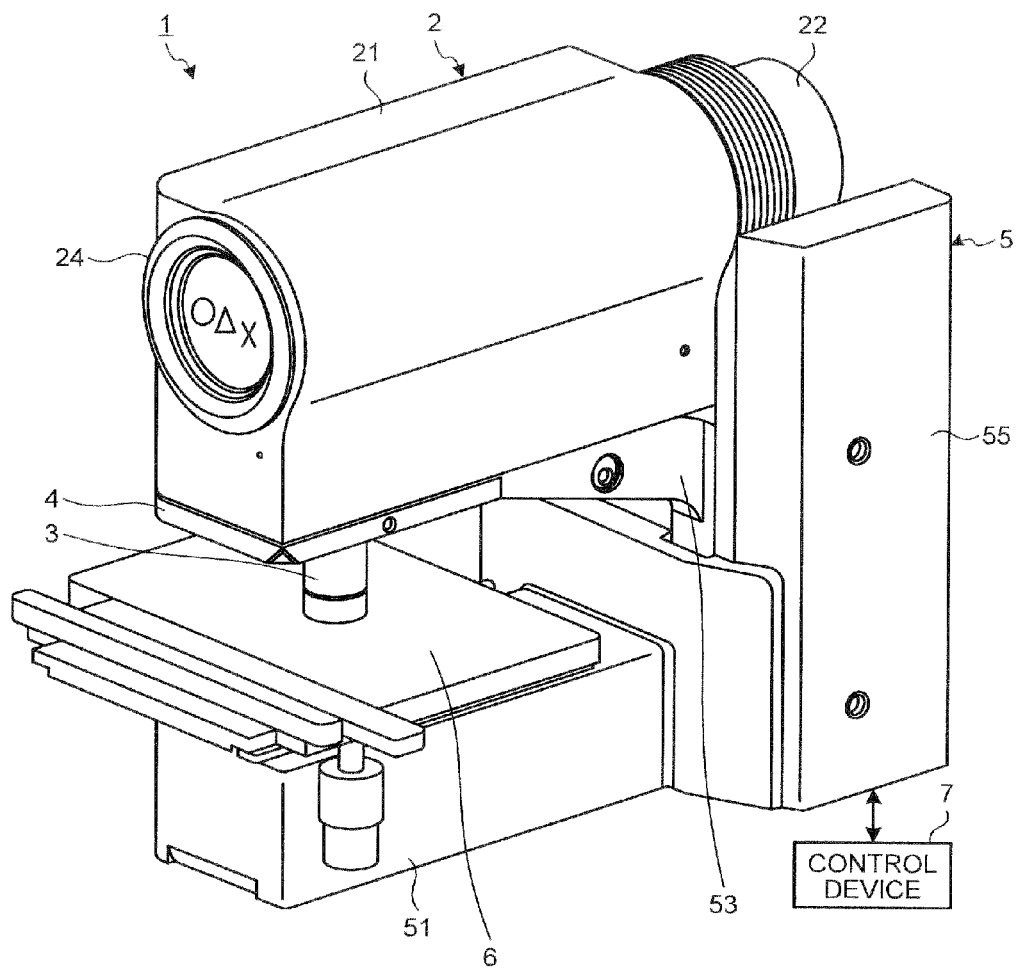
FIG. 1 is a perspective view illustrating an external appearance configuration of a microscope system according to a first embodiment of the present invention.
Figure 2:
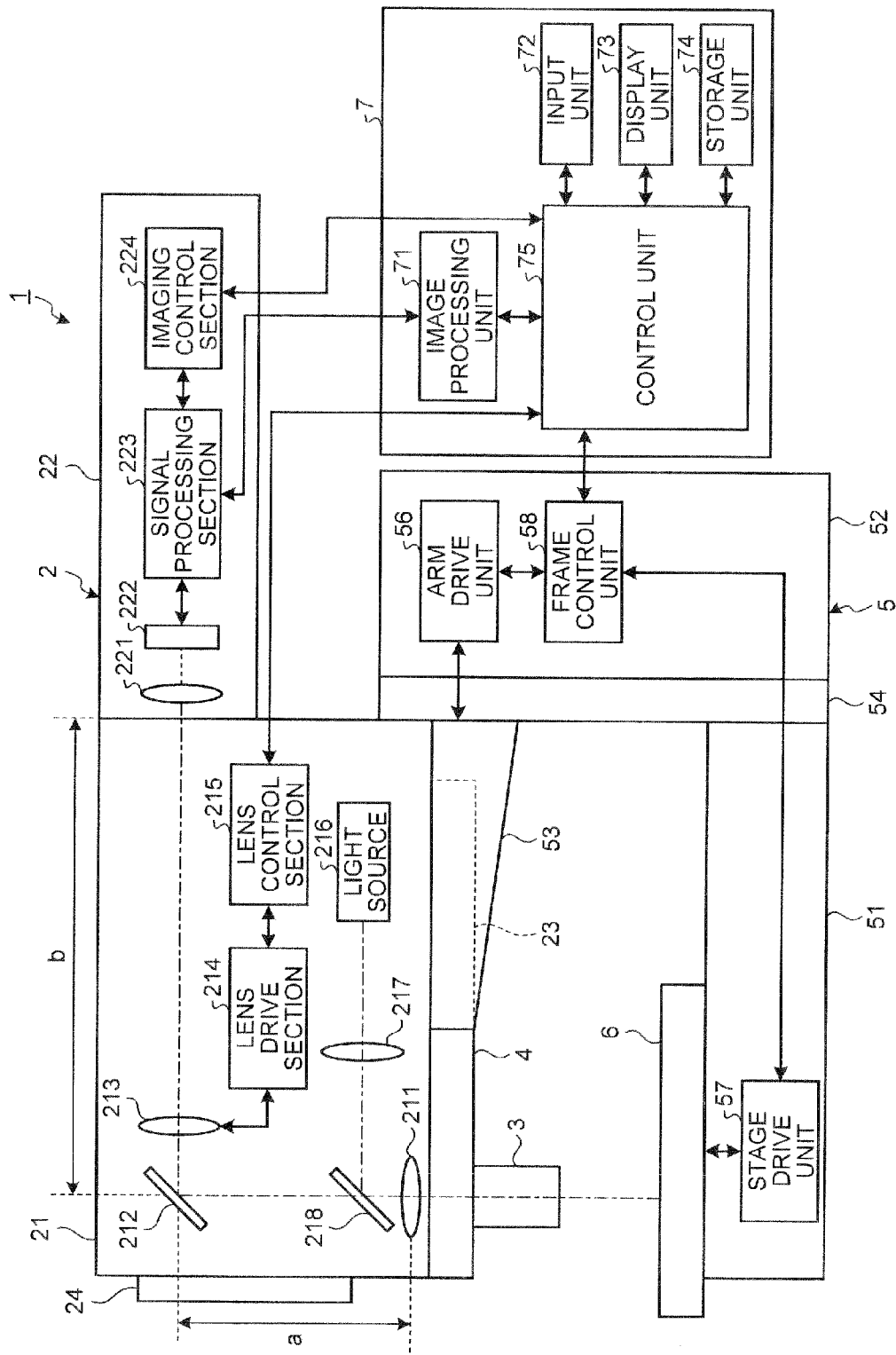
FIG. 2 is a diagram illustrating a functional configuration of the microscope system according to the first embodiment of the invention.

FIG. 1 is a perspective view illustrating an external appearance configuration of a microscope system according to a first embodiment of the present invention. FIG. 2 is a diagram illustrating a functional configuration of the microscope system according to the first embodiment of the invention. A microscope system 1 illustrated in the drawings includes a camera head 2 formed with an image-forming optical system and an imaging optical system as a single unit, a nosepiece 4 that is attached to the camera head 2 and slidably holds an objective lens 3, an upright frame 5 (microscope frame) that forms substantially the shape of letter C when viewed from a side and movably holds the camera head 2, which can be moved up and down, a stage 6 that is attached to the upright frame 5 so that a specimen is placed thereon, and a control device 7 that controls the microscope system 1 overall. The camera head 2, the upright frame 5 and the control device 7 are connected to one another in a wired or wireless manner for communication in order to transmit and receive information between the elements.

Figure 3:
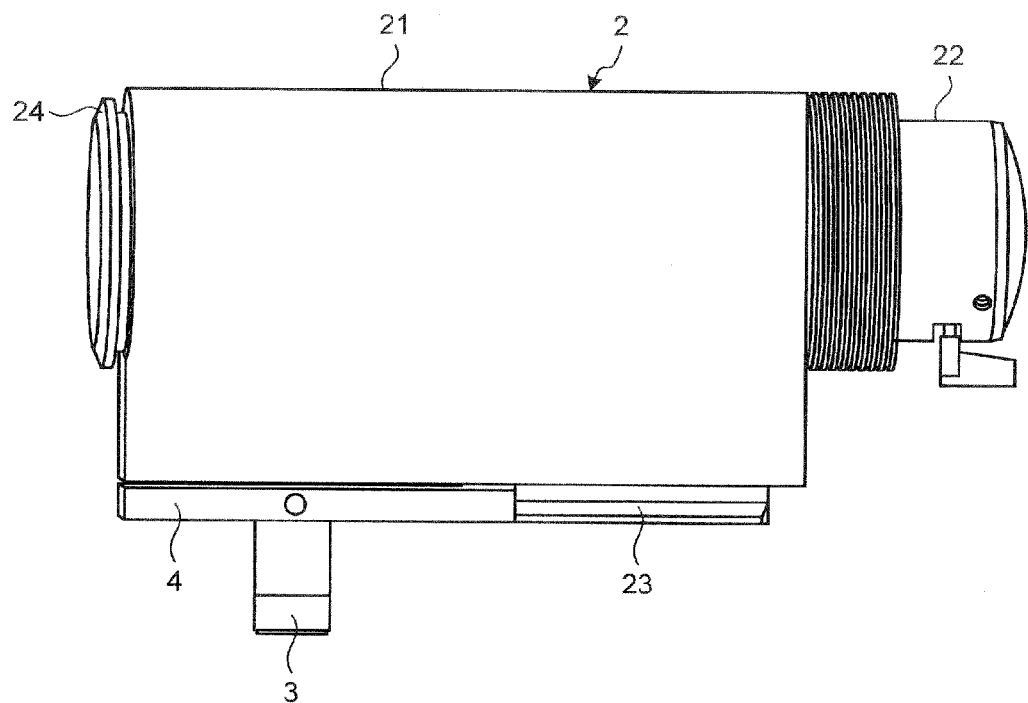
FIG. 3 is a side view illustrating an external appearance configuration of a camera head according to the first embodiment of the invention.

FIG. 3 is a side view illustrating an external appearance configuration of the camera head 2. The camera head 2 includes a housing 21 that accommodates a variety of functional components therein, an imaging unit 22 that is attached to one end of the housing 21 in the longitudinal direction, a frame attachment unit 23 that is attached to the upright frame 5 so as to be fixed, and an emblem adaptor 24 (symbol information description member) that is provided on the side face of the other end of the housing 21 in the longitudinal direction, and has a circular surface on which symbol information that a human being can recognize visually or tactually is recorded, and of which the circular surface can rotate around an axis penetrating the center of the surface and orthogonal to the surface. Symbol information mentioned herein is information including any one of, for example, characters, figures, symbols, paintings, patterns, and the like. More specifically, in the emblem adaptor 24, at least one of the trade name, model name, and manufacturer of the microscope system 1 is described as symbol information.

An internal configuration of the housing 21 will be described. Inside the housing 21, an image-forming optical system 211 that is provided on the optical axis of the objective lens 3 attached to the nosepiece 4 so as to form images with light coming through the objective lens 3, a reflective mirror 212 that reflects light emitted from the image-forming optical system 211 and then deflects the optical path of the light, a zoom optical system 213 that is provided between the reflective mirror 212 and the imaging unit 22 and can change the focal length of light reflected by the reflective mirror 212, a lens drive section 214 that drives a lens of the zoom optical system 213, and a lens control section 215 that controls the drive of the lens drive section 214 are provided. Incidentally, in FIG. 2, the image-forming optical system 211 and the zoom optical system 213 are schematically illustrated by one lens respectively; however, the optical systems can be configured with a plurality of lenses.

Inside the housing 21, a light source 216 that generates illuminating light for irradiating a specimen placed on the stage 6, a condenser lens 217 that condenses the illuminating light generated by the light source 216, and a half mirror 218 that deflects the optical path of illuminating light so as to match with the optical axis of the objective lens 3 and transmits light from the objective lens 3 are provided. The condenser lens 217 and the half mirror 218 form an illumination optical system that irradiates a specimen with light generated by the light source 216 via the objective lens 3. The light source 216 can be configured with a halogen lamp, a xenon lamp, a Light Emitting Diode (LED), or the like.

The light source 216, the condenser lens 217, and the half mirror 218 are attached to an adaptor for attaching the illumination optical system provided inside the housing 21. When conducting the attachment, the adaptor may be exposed by opening a cover (not illustrated) provided in the lower portion of the side face that is the side face in the right side of FIG. 3 and onto which the imaging unit 22 is attached. Incidentally, the light source 216 can be appropriately replaced. Thus, a user can adjust illuminating light by applying the light source 216 with desired brightness.

In the housing 21, the distance a between the image-forming optical system 211 and the center of the reflective mirror 212 is shorter than the distance b between the center of the reflective mirror 212 and the imaging unit 22 (a<b). By setting the shape of the camera head 2 to be horizontally long, it is possible to restrict the height of the camera head when being attached to the upright frame 5 to a low level. Thus, the center of gravity of the microscope system 1 can be set to be low, and the effect of preventing overturning can be obtained.

The imaging unit 22 includes an imaging lens 221 that condenses light passing through the housing 21, an imaging device 222 that is configured with a CCD (Charge Coupled Device), a CMOS (Complementary Metal Oxide Semiconductor), or the like and outputs by performing photoelectric conversion for light into an electronic signal, a signal processing section 223 that performs a predetermined signal process such as A/D conversion, or the like for the electronic signal output by the imaging device 222, and an imaging control section 224 that controls the operation of the imaging unit 22. The imaging unit 22 captures an image of a specimen incident through the imaging lens 221 so as to generate image data, and then outputs the image data to the control device 7 based on the control of the imaging control section 224. Incidentally, the imaging lens 221 can also be configured by a plurality of lenses.

The imaging control section 224 is configured by using a CPU, or the like, and controls the operation of the imaging unit 22. Specifically, the imaging control section 224 controls an ON/OFF switching process of automatic gain control of the imaging unit 22, a setting process of gain and a frame rate, an AE process, and an imaging operation of the imaging unit 22 by performing the AF process, or the like.

The frame attachment unit 23 is formed on a side face of the camera head 2 on which the nosepiece 4 is provided. The frame attachment unit 23 is fitted to an arm 53 of the upright frame 5 to be described later so as to be slidable along the direction where the arm 53 extends. Specifically, the frame attachment unit 23 has a cross-section orthogonal to the sliding direction formed substantially in a trapezoidal shape, and a male dovetail shape that can be fitted to a female-type dovetail groove.

The nosepiece 4 holds the objective lens 3 slidable in a direction orthogonal to the optical axis of the objective lens 3 with respect to the camera head 2. In the case illustrated in FIG. 2, a sliding mechanism of the objective lens 3 is assumed to be a manual type, but can also be assumed to be an electric type. In addition, as a lens holding section, a revolving nosepiece may also be applied instead of the nosepiece.

Figure 4:
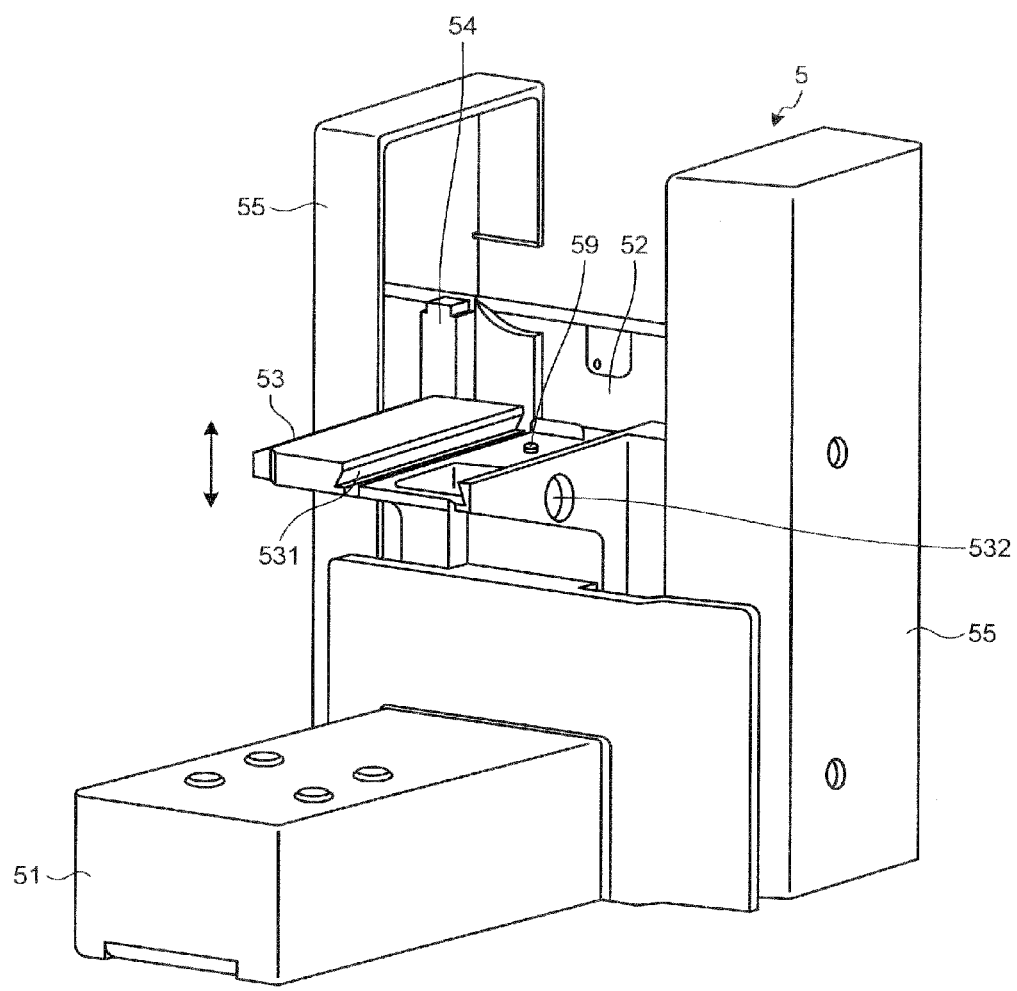
FIG. 4 is a perspective view illustrating a configuration of an upright frame according to the first embodiment of the invention.
Figure 5:
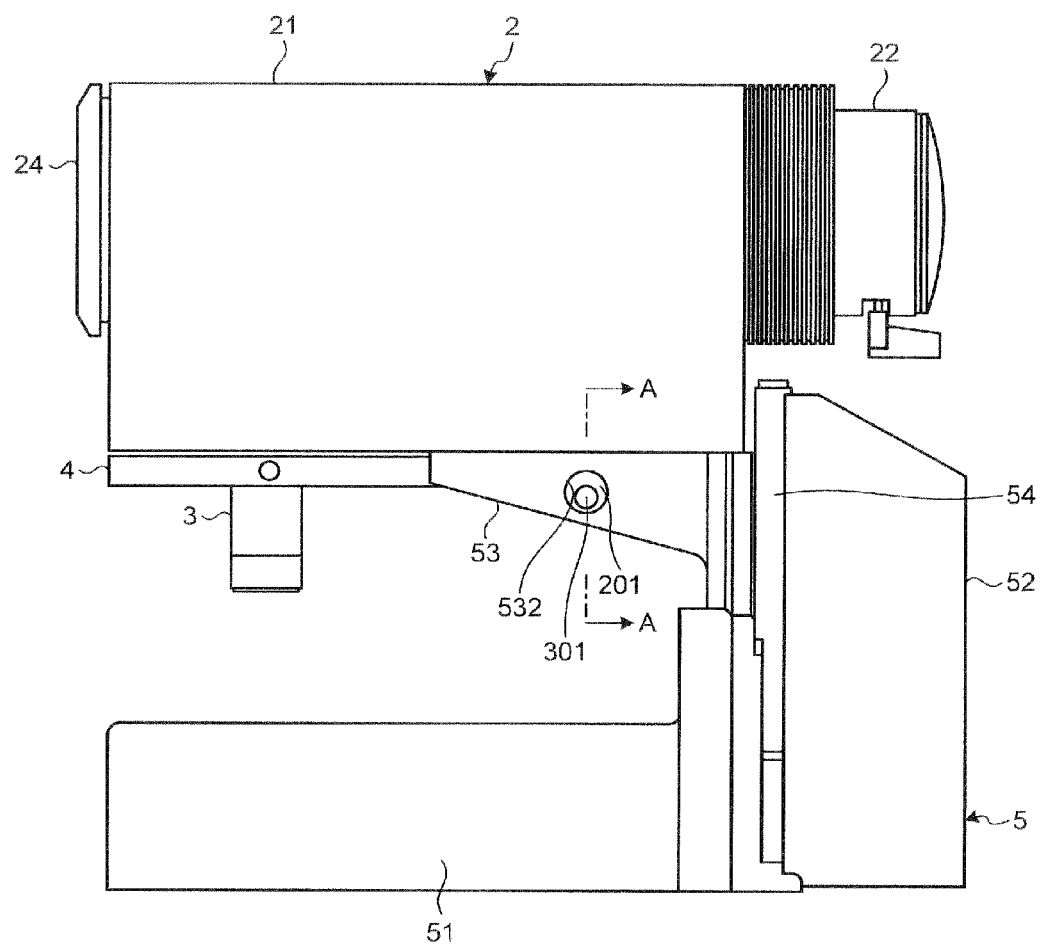
FIG. 5 is a side view illustrating a configuration of main sections of the upright frame in a state where the camera head according to the first embodiment of the invention is mounted.

Next, a configuration of the upright frame 5 will be described. FIG. 4 is a perspective view illustrating the configuration of the upright frame 5. FIG. 5 is a side view illustrating a configuration of main sections of the upright frame 5 in a state where the camera head 2 is attached thereto. The upright frame 5 includes a base 51 on which the stage 6 is placed, a mirror column 52 that is provided in one end portion of the base 51 in the longitudinal direction and stands in the direction orthogonal to the bottom face of the base 51, the arm 53 that extends substantially in parallel to the bottom face of the base 51 from the surface that is the surface of the mirror column 52 and in the side facing the base 51, and is movable upward and downward along the height direction of the mirror column 52 while holding the camera head 2, a guide 54 that is provided on the surface of the mirror column 52 and guides an upward or downward movement of the arm 53, two cover members 55 attached to side faces of the mirror column 52, an arm drive unit 56 that causes the arm 53 to move upward or downward, a stage drive unit 57 that drives the stage 6 placed on the base 51, and a frame control unit 58 that controls the operation of the arm drive unit 56 and the stage drive unit 57. Incidentally, FIG. 5 is a side view in a state where the cover members 55 are detached.

The arm 53 includes a camera head holding section 531 that slidably holds the frame attachment unit 23. Specifically, the camera head holding section 531 has a female type dovetail groove so as to be fitted to the frame attachment unit 23 in a male dovetail shape. Herein, the camera head holding section 531 is fitted to the upright frame 5 in a slidable manner in the direction that is parallel to the surface of the stage 6 to be placed in the upright frame 5 and orthogonal to the optical axis of the objective lens 3 attached to the camera head 2.

As illustrated in FIG. 4, the camera head holding section 531 can be viewed from the base 51 side. The arm 53 having the above-described configuration is configured to have a sufficient anti-vibration property and rigidity even when the camera head 2 is moved upward or downward in the attached state for observation or imaging.

The arm drive unit 56 is realized by using a motor and a rack-and-pinion or a ball screw driven by the motor. The arm drive unit 56 causes the arm 53 to move upward or downward along the guide 54 by a linear movement of the rack-and-pinion or the ball screw. Incidentally, the arm drive unit 56 may be a manual type.

Figure 6:
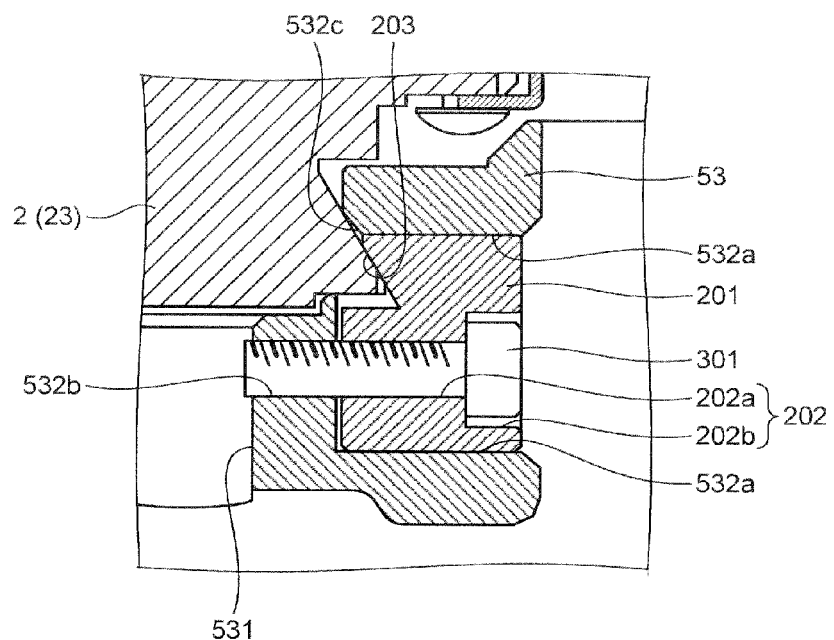
FIG. 6 is a partial cross-sectional view taken along line A-A of FIG. 5.

FIG. 6 is a partial cross-sectional view taken along line A-A of FIG. 5. As illustrated in FIG. 6, the arm 53 is formed with a through hole 532 that penetrates from the outer side face of the arm to a side face of the camera head holding section 531. The through hole 532 includes a large diameter portion 532a having an opening facing the outer side face of the arm 53, a small diameter portion 532b that communicates with the large diameter portion 532a and has a smaller diameter than the large diameter portion 532a, and an opening part 532c that is formed by penetrating a side face of the dovetail groove of the camera head holding section 531.

Into the large diameter portion 532a, a piece 201 having substantially a cylindrical shape is fitted. The piece 201 has a through hole 202 formed so as to communicate with the small diameter portion 532b in the state of being fitted into the arm 53, and a cutout 203 formed so as to be smoothly connected to the dovetail groove of the camera head holding section 531 in the state of being fitted into the arm 53. The through hole 202 includes a small diameter portion 202a into which a screw 301 can be fastened, and a large diameter portion 202b that can accommodate the head portion of the screw 301 and has a larger diameter than the small diameter portion 202a. The small diameter portion 532b of the arm 53 that communicates with the piece 201 in the state of being fitted to the arm 53 and the small diameter portion 202a of the through hole 202 of the piece 201 have the same diameter, and the screw 301 can be fastened thereinto in order to fix the camera head 2 to the arm 53.

Figure 7:
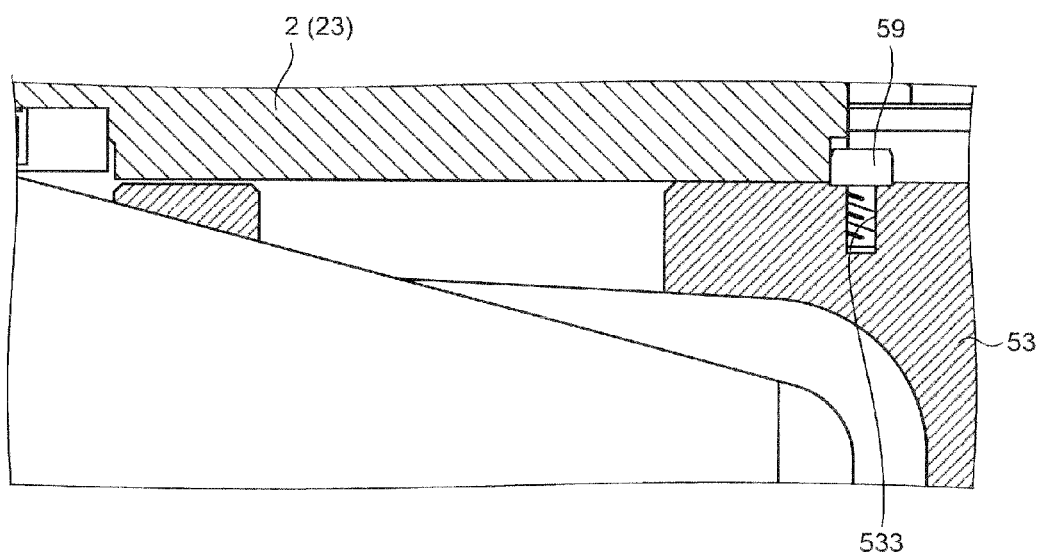
FIG. 7 is a diagram illustrating a configuration of a cross-section which passes through an abutting member and of which the direction is parallel with the direction where an arm extends in FIG. 5.

On the bottom face of the camera head holding section 531 in the vicinity of the source of the arm 53, an abutting member 59 is provided which performs positioning when the camera head 2 is slid to be fitted. FIG. 7 is a drawing illustrating a configuration of the cross-section that is viewed passing through the abutting member 59 and parallel with the direction where the arm 53 extends in FIG. 5. In the case illustrated in FIG. 7, the abutting member 59 is a screw fastened into a hole portion 533 provided on the arm 53. Incidentally, as the abutting member 59, any member can be used as long as the member comes into contact with the camera head 2 so as to perform positioning of the camera head 2, and thus, the member does not need to be a screw.

The stage 6 is configured to freely move within a two-dimensional plane that is parallel to the top face of the base 51 of the upright frame 5 by the drive of the stage drive unit 57.

Next, a configuration of the control device 7 will be described. The control device 7 includes an image processing unit 71 that performs an image process based on image data sent from the signal processing section 223 of the imaging unit 22, an input unit 72 that receives an input of various kinds of information including an operation instructing signal of the control device 7, a display unit 73 on which various kinds of information including images captured by the imaging unit 22 can be displayed, a storage unit 74 that stores various kinds of information such as image information captured by the imaging unit 22, an operation program to be executed by the microscope system 1, or the like, and a control unit 75 that is realized by using a CPU, or the like so as to collectively control the entire operation of the microscope system 1 including the control device 7 itself.

The image processing unit 71 performs a predetermined image process for image data transmitted from the imaging unit 22 so as to generate a display image to be displayed on the display unit 73. Specifically, the image processing unit 71 performs, for the image data, an image process including an optical black subtraction process, a white balance adjustment process, a synchronization process, a color matrix arithmetic process, a γ-correction process, a color reproduction process, an edge enhancement process, and the like. The image processing unit 71 compresses the image data in a predetermined format, and outputs the compressed image data to the storage unit 74. The compression format mentioned herein is, for example, JPEG (Joint Photographic Experts Group) in the case of still images, or the like. In addition, the compression format in the case of moving images is MP4 (H.264), or the like.

The input unit 72 is configured by using a keyboard, a mouse, a joystick, various switches, and the like, and outputs an operation signal according to operation inputs of such various switches to the control unit 75.

The display unit 73 is configured by using a display panel formed with liquid crystal or organic EL (Electro Luminescence), or the like. Incidentally, by providing a touch panel that receives a signal input according to contact of an object from outside on the display screen of the display unit 73, the touch panel may serve as a part of the input unit 72. For such a touch panel, any type of a resistive film type, an electrostatic capacitance type, and an optical type can also be applied.

The storage unit 74 is realized by using a semiconductor memory such as a flash memory, a RAM (Random Access Memory), or the like that is fixedly provided inside the control device 7. The storage unit 74 stores image data generated by the imaging unit 22 and then processed by the image processing unit 71, various programs executed in the microscope system 1, and various kinds of data used in execution of such programs.

In the microscope system 1 with the above-described configuration, when the camera head 2 is to be attached to the arm 53, the rear end portion that is the end portion close to the imaging unit 22 out of the end parts of the frame attachment unit 23 is fitted into the leading end portion of the camera head holding section 531 and then the camera head 2 is slid toward the base end portion of the arm 53. Accordingly, the rear end portion of the frame attachment unit 23 is inserted to the base end portion side that is the end portion close to the mirror column 52 out of the end portions of the camera head holding section 531. After that, when the rear end portion of the frame attachment unit 23 reaches the state of coming into contact with the abutting member 59, the screw 301 is fastened to the small diameter portion 202a of the through hole 202 formed in the piece 201 and the small diameter portion 532b of the through hole 532 formed in the arm 53, and accordingly, the camera head 2 is fixed to the arm 53. Accordingly, the camera head 2 can stably move upward or downward with the arm 53.

When the arm 53 is moved upward or downward, the frame control unit 58 causes the arm drive unit 56 to generate a drive signal (predetermined pulse when the arm drive unit 56 is a motor). A signal that serves as the base of the drive signal is received by the frame control unit 58 from the control unit 75. The control unit 75 generates a control signal based on, for example, an instruction signal that the input unit 72 receives.

According to the first embodiment of the present invention described above, since the microscope frame on which the stage is placed and the camera head of which the objective lens is attachable and which is attached to the microscope frame as being slidably fitted to the microscope frame in the direction parallel with the surface of the stage placed on the microscope frame and orthogonal to the optical axis of the attached objective lens so as to capture an image of a specimen are provided, it is possible to easily switch to an optimum observation state according to the observation situation.

In addition, according to the first embodiment, since the camera head includes optical systems as a single unit, the adjustment of the optical axis during the attachment of the camera head is not necessary, so the attachment is simple. Thus, switching to the optimum observation state in accordance with an observation direction and the size of a specimen can be realized while accuracy in imaging and measurement is maintained.

In addition, according to the first embodiment, since the distance between the image-forming optical system and the reflective mirror is shorter than the distance between the reflective mirror and the imaging unit, it is possible to restrict the height of the camera head when being attached to the upright frame to a low level. Thus, the center of gravity of the microscope system can be set to be low, and overturning thereof can be prevented.

Furthermore, according to the first embodiment, since the reflective mirror of the camera head deflects the optical path, the entire camera head can be configured to be compact.

Generally, when the optical path is deflected in the middle of the optical systems, a mirror image is generated in every deflection. For this reason, when visual observation is performed, the number of deflections has to be set so that such a mirror image is resolved. In this regard, when observation is performed by using an image captured by the imaging unit, a mirror image can be corrected through an image process, and thus, there is no restriction on the number of deflections in the optical systems. Therefore, according to the first embodiment, the effect of increasing the degree of freedom in designing the camera head is obtained.

Second Embodiment

Figure 8:
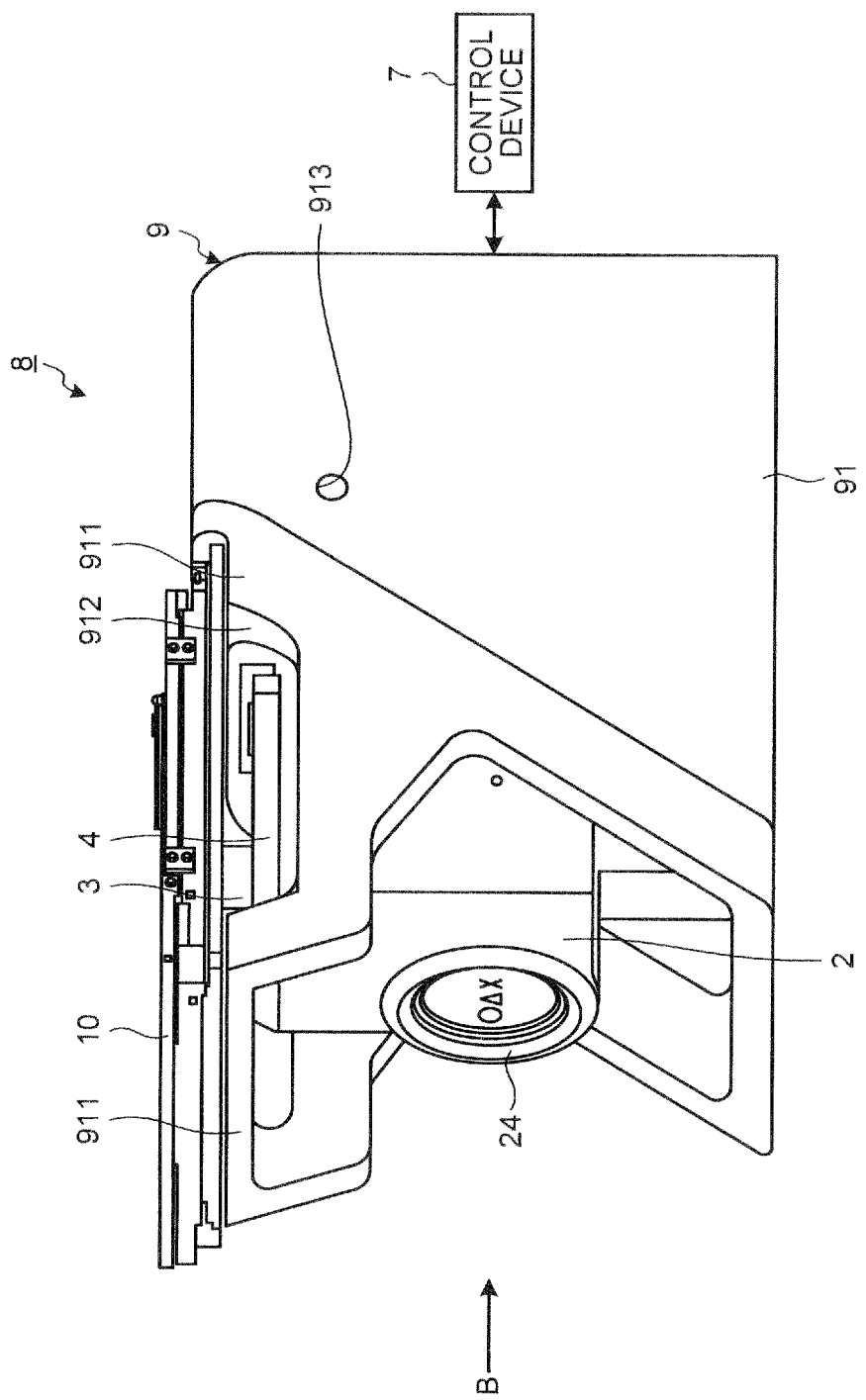
FIG. 8 is a perspective view illustrating an external appearance configuration of a microscope system according to a second embodiment of the invention.
Figure 9:
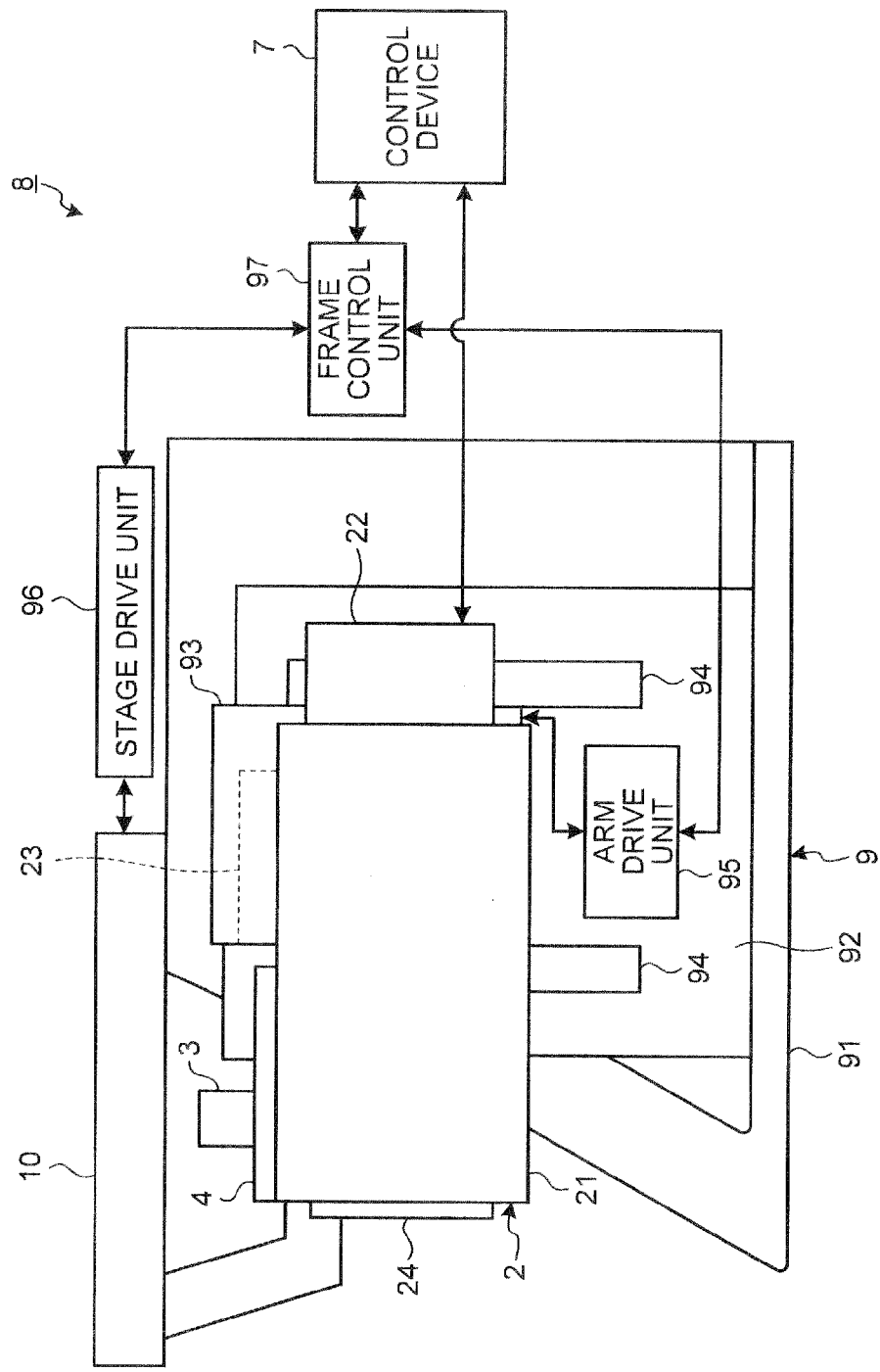
FIG. 9 is a diagram illustrating a functional configuration of the microscope system according to the second embodiment of the invention.

FIG. 8 is a perspective view illustrating an external appearance configuration of a microscope system according to a second embodiment of the invention. FIG. 9 is a diagram illustrating a functional configuration of the microscope system according to the second embodiment. A microscope system 8 illustrated in FIGS. 8 and 9 includes the camera head 2, the nosepiece 4, the control device 7, an inverted frame 9 (microscope frame) holding the camera head 2 so that the camera head can move upward or downward, and a stage 10 that is attached to the inverted frame 9 and on which a specimen is placed.

In the case illustrated in FIG. 8, the upper and lower portions of the camera head 2 are reversed in comparison to the case of the first embodiment (refer to FIG. 1 and the like). On the contrary, the upper and lower portions of symbol information described in the emblem adaptor 24 are the same as those illustrated in FIG. 1, and the like. This is because a user rotates the upper and lower portions of the emblem adaptor 24 by 180 degrees from the state illustrated in FIG. 1 when the camera head 2 is to be attached to the inverted frame 9. In this way, by rotating the emblem adaptor 24 so as to fit to the upper and lower portions of the camera head 2, it can be clearly ascertained in what state the camera head 2 is attached to the microscope frame. In addition, the symbol information described on the emblem adaptor 24 can be adjusted to a position at which the information can be visually recognized with ease.

Figure 10:
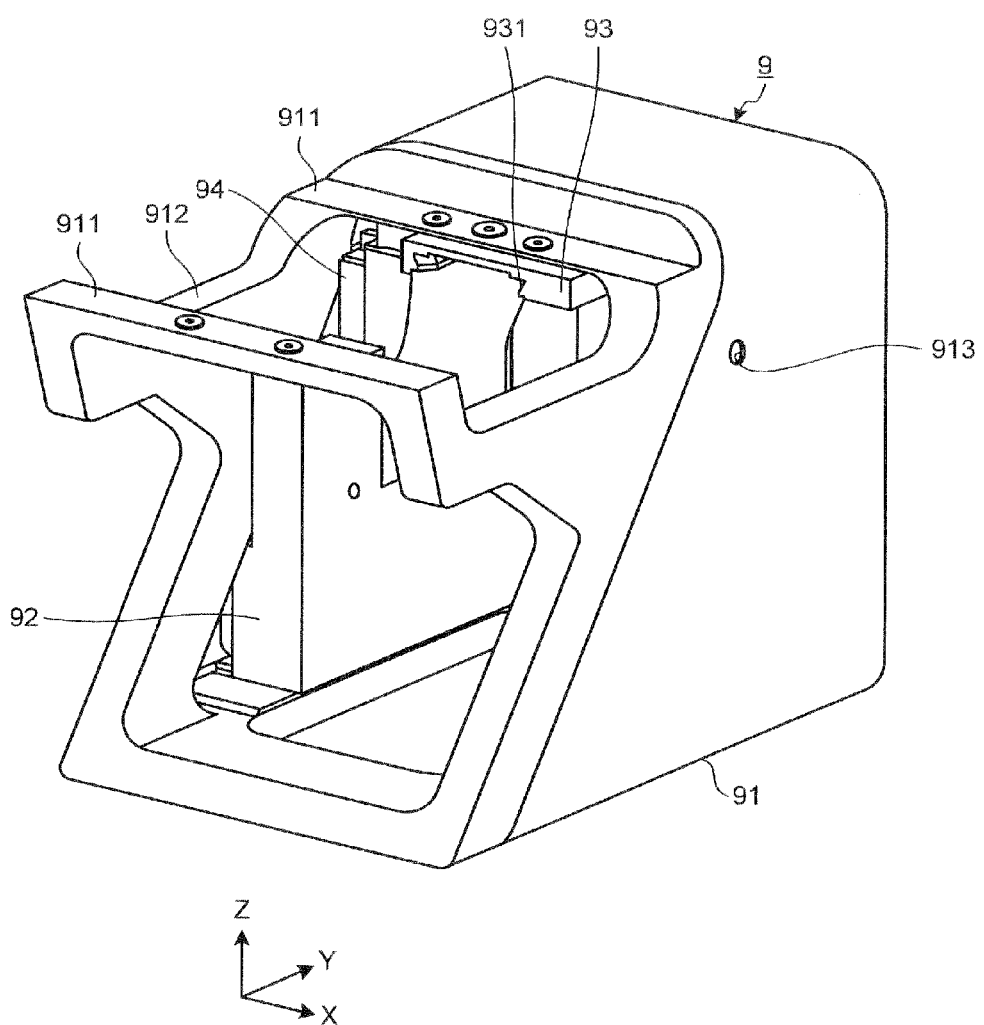
FIG. 10 is a perspective view illustrating a configuration of an inverted frame according to the second embodiment of the invention.
Figure 11:
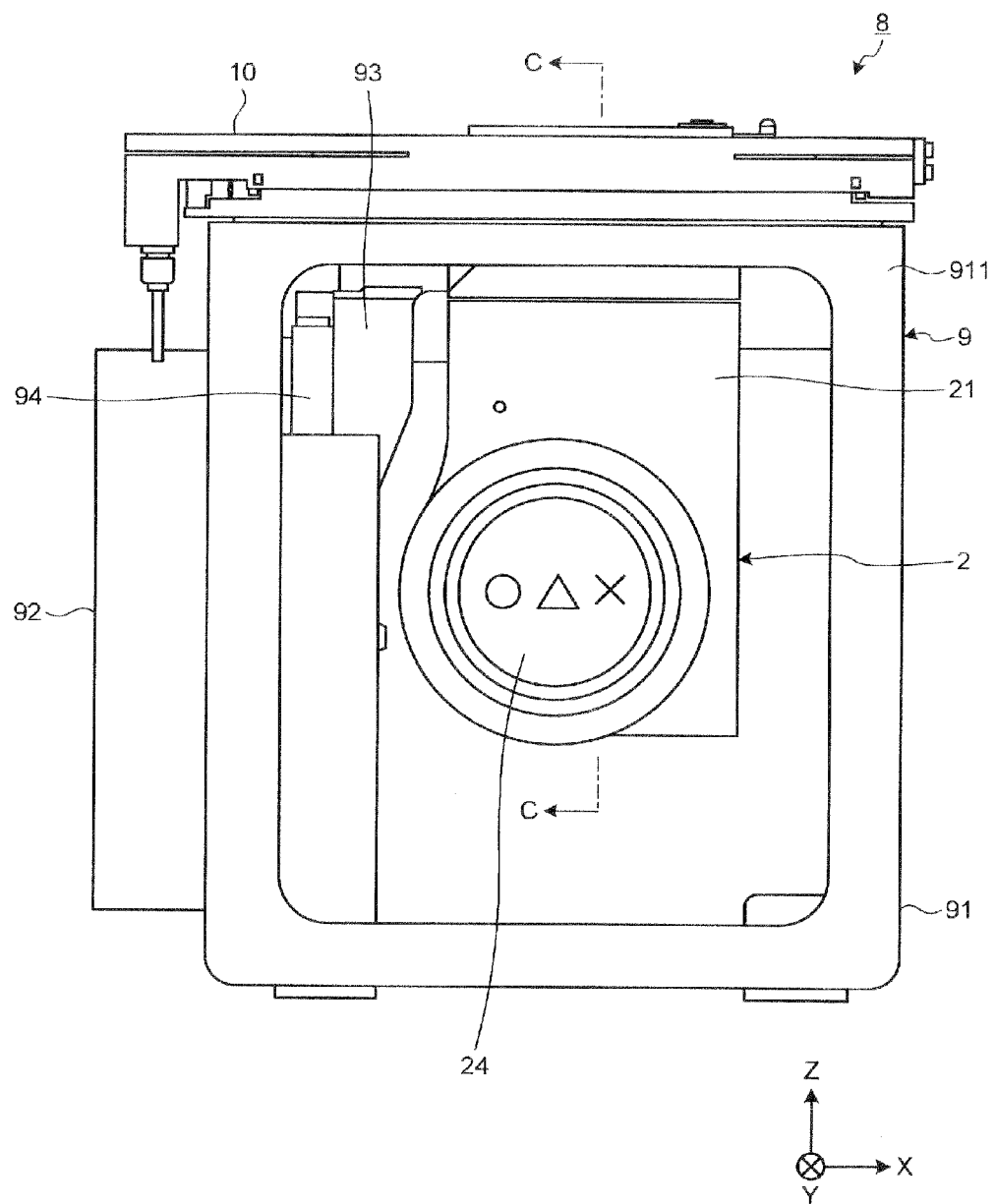
FIG. 11 is a front view taken from the direction of the arrow B of FIG. 8.

FIG. 10 is a perspective view illustrating a configuration of the inverted frame 9. FIG. 11 is a front view taken from the direction of the arrow B of FIG. 8, illustrating configurations of the main sections of the inverted frame 9 in the state where the camera head 2 is attached thereto. Hereinafter, the configuration of the inverted frame 9 will be described with reference to FIGS. 8 to 11. The inverted frame 9 includes a base 91 on which the stage 10 is placed, a mirror column 92 that stands in the direction orthogonal to the bottom face of the base 91, an arm 93 that extends forming the shape of letter L having a surface of the mirror column 92 as one side and is movable upward and downward along the height direction of the mirror column 92 while holding the camera head 2, a guide 94 that guides an upward or downward movement of the arm 93, an arm drive unit 95 that drives the arm 93, a stage drive unit 96 that drives the stage 10 placed on the base 91, and a frame control unit 97 that controls the operation of the arm drive unit 95 and the stage drive unit 96.

The base 91 forms a sleeve shape in which one side face and the other side face facing the former side face are opened along the insertion direction (the Y-axis direction of FIGS. 10 and 11) of the camera head 2. The base 91 includes two stage placing sections 911 on which both end portions of the stage 10 are placed respectively and recesses 912 that are provided between the two stage placing sections 911, form an opening facing the stage 10, and formed in a shape dented from the top face of the stage placing sections 911. Since the recesses 912 have the above-described shape, when the user views the microscope system 8 from a side face of the inverted frame 9, the user can see the objective lens 3 (refer to FIG. 8). Therefore, the user can visually ascertain the magnification of the objective lens 3 and the distance from the objective lens 3 to the specimen on the stage 10 through the recess 912 from a side.

On a side face of the base 91, an insertion hole 913 for inserting the tip portion of a tool that performs screw-fixing when the camera head 2 is to be attached to the arm 93 is provided.

The arm 93 has a camera head holding section 931 that holds the camera head 2 to be suspended in an inner area that penetrates the base 91. The camera head holding section 931 is formed in a female type dovetail groove shape bored along the direction in which the arm 93 extends and is fitted to and holds the frame attachment unit 23 formed in a male dovetail shape in a slidable manner.

Figure 12:
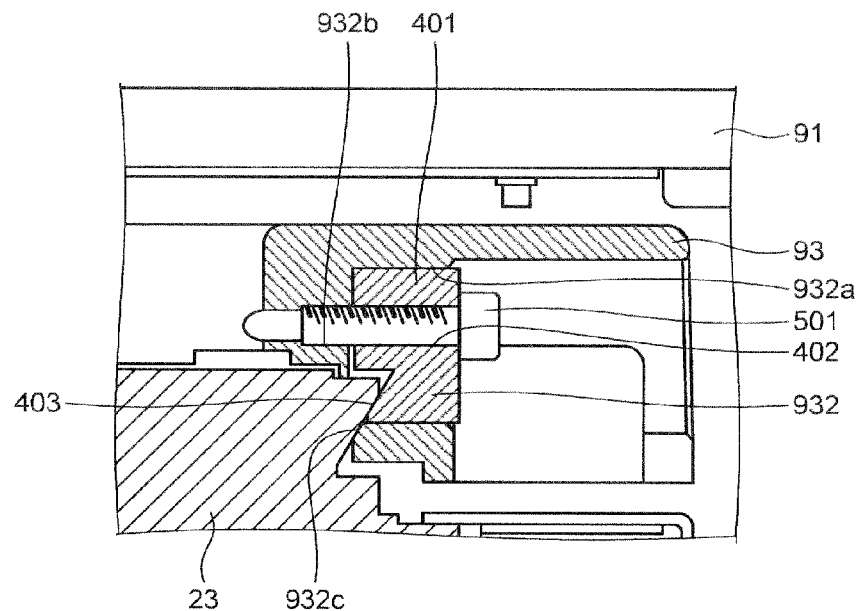
FIG. 12 is a partial cross-sectional view illustrating a fixed configuration of a frame attachment unit and an arm of an inverted frame.

FIG. 12 is a partial cross-sectional view illustrating a fixation configuration of the frame attachment unit 23 and the arm 93. In the arm 93, a through hole 932 is formed which penetrates from an outer side face of the arm to a side face of the camera head holding section 931. The through hole 932 includes a large diameter portion 932a having an opening facing the outer side face of the arm 93, a small diameter portion 932b that communicates with the large diameter portion 932a and has a smaller diameter than the large diameter portion 932a, and an opening portion 932c formed by penetrating a side face of the dovetail groove.

Into the large diameter portion 932a, a piece 401 having substantially a cylindrical shape is fitted. The piece 401 includes a through hole 402 that penetrates the small diameter portion 932b so as to communicate therewith in the state of being fitted into the arm 93, and a cutout 403 formed so as to be smoothly connected to the dovetail groove of the arm 93 in the state of being fitted into the arm 93. The small diameter portion 932b of the arm 93 that communicates with the piece 401 in the state of being fitted, the arm 93 and the through hole 402 of the piece 401 have the same diameter, and a screw 501 can be fastened thereinto in order to fix the camera head 2 to the arm 93.

Figure 13:
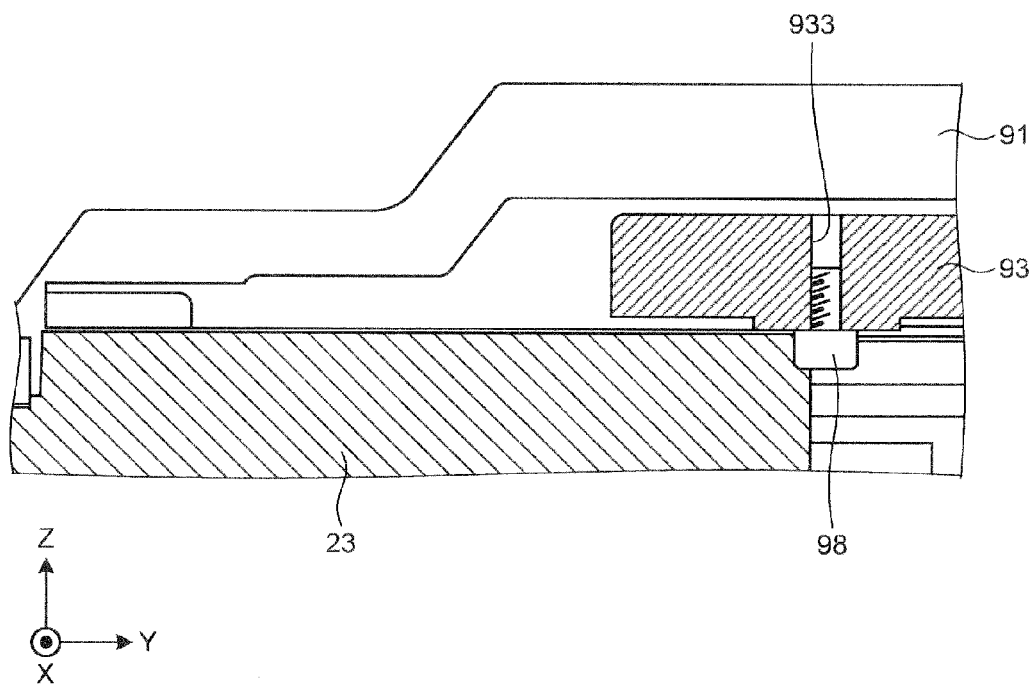
FIG. 13 is a partial cross-sectional view taken along line C-C of FIG. 11.

When the front end or the rear end is decided along the positive direction of the Y-axis direction of the arm 93, on the bottom face that is of the camera head holding section 931 in the vicinity of the rear end portion of the arm 93, an abutting member 98 is provided which performs positioning when the camera head 2 is slid so as to be fitted thereto. FIG. 13 is a partial cross-sectional view taken along line C-C of FIG. 11, illustrating a configuration of the abutting member 98. In the case illustrated in FIG. 13, the abutting member 98 is a screw that is fastened into a hole 933 provided in the arm 93. Also in the second embodiment, as the abutting member 98, any member is possible as long as the member can come into contact with the camera head 2 and perform positioning of the camera head 2, and the member does not have to be a screw.

In the microscope system 8 having the above-described configuration, when the camera head 2 is to be attached to the arm 93, the rear end portion of the camera head 2 is inserted to the inner space of the inverted frame 9 from the front face side of the inverted frame 9, the rear end portion thereof is fitted to the front end portion of the camera head holding section 931, and then the camera head 2 is made to slide into the arm 93. After that, when the rear end portion of the frame attachment unit 23 reaches the state of coming into contact with the abutting member 98, the screw 501 is fastened to the through hole 402 formed in the piece 401 and the small diameter portion 932b of the through hole 932 formed in the arm 93, and accordingly, the camera head 2 is fixed to the arm 53. Accordingly, the camera head 2 can stably move upward or downward with the arm 93.

According to the second embodiment of the present invention described above, it is possible to easily switch to an optimum observation state according to the observation direction and the size of a specimen while maintaining accuracy in imaging and measurement as in the first embodiment.

In addition, according to the second embodiment, since the distance between the image-forming optical system and the reflective mirror is shorter than the distance between the reflective mirror and the imaging unit, it is possible to perform the attachment even to the inverted frame without raising the stage.

Third Embodiment

A microscope system according to a third embodiment of the present invention is characterized by including the camera head 2 that is a common element in the first and the second embodiments, the upright frame 5 described in the first embodiment, and the inverted frame 9 described in the second embodiment.

In the microscope system according to the third embodiment, a user can select an optimum observation method among the upright and the inverted types depending on a specimen and other various conditions in every observation. Therefore, the user can observe the specimen using a desired observation method.

Furthermore, according to the third embodiment, when the microscope system is constructed by the camera head having an optical system as a single unit and a plurality of microscope frames that are different from each other and to which the camera head can be attached, adjustment of the optical axis is not necessary during the attachment of the camera head to each of the microscope frames, but switching is easy. Thus, it does not have to prepare camera heads for each microscope frame, and therefore, cost-saving and high efficiency can be achieved.

Incidentally, the microscope system according to the third embodiment may include any kind of microscope frames as long as the microscope frames can commonly use the camera head, and there is also no restriction on the number of microscope frames.

Fourth Embodiment

Figure 14:
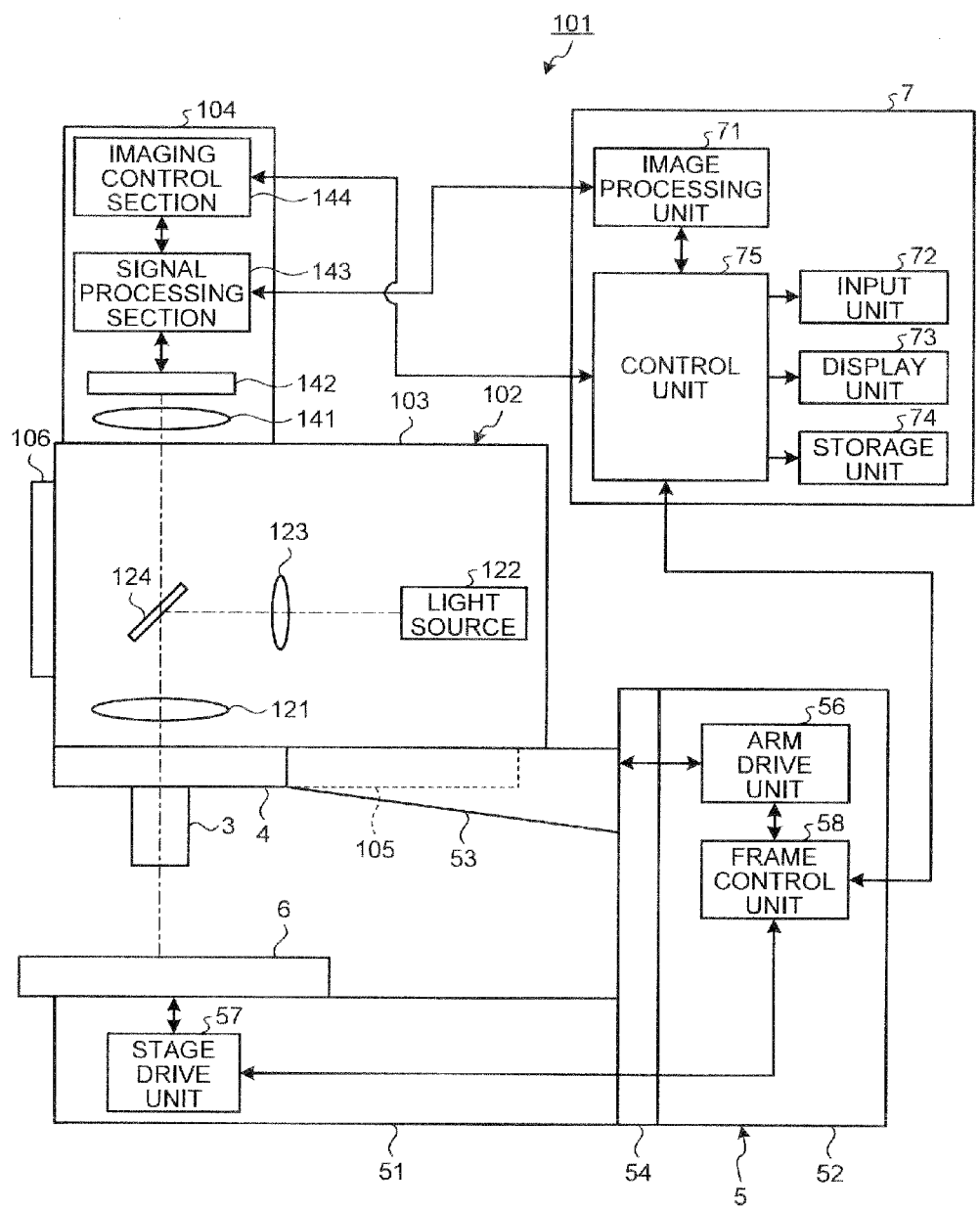
FIG. 14 is a diagram illustrating a functional configuration of a microscope system according to a fourth embodiment of the invention.

FIG. 14 is a diagram illustrating a function configuration of a microscope system according to a fourth embodiment of the present invention. A microscope system 101 illustrated in the drawing includes a camera head 102, and an upright frame 5 to which the camera head 102 is attached.

The camera head 102 includes a housing 103 that accommodates various functional components therein, an imaging unit 104 attached to one end portion of the housing 103 in the longitudinal direction, a frame attachment unit 105 that is fixed to the camera head 102 and the upright frame 5 by being attached thereto, and an emblem adaptor 106 that is attached to the other end portion of the housing 103 in the longitudinal direction and on which at least one of the trade name, model name, manufacturer of the microscope system 101 is described.

An internal configuration of the housing 103 will be described. Inside the housing 103, an image-forming optical system 121 that is disposed on the optical axis of the objective lens 3 and forms an image with light from the objective lens 3, a light source 122 that generates illuminating light for irradiating a specimen placed on the stage 6 through the objective lens 3, a condenser lens 123 that condenses the illuminating light generated by the light source 122, and a half mirror 124 that deflects the optical path of illuminating light so as to match with the optical axis of the objective lens 3 and transmits light from the objective lens 3 are provided.

The imaging unit 104 includes an imaging lens 141 that condenses light that has passed through the housing 103, an imaging device 142 that converts light into an electric signal so as to be output, a signal processing section 143 that performs a predetermined signal process such as A/D conversion, or the like for the electric signal output by the imaging device 142, and an imaging control section 144 that controls the operation of the imaging unit 104.

The camera head 102 is different from the camera head 2 described in the first embodiment, and does not include a zoom lens. Thus, it is possible to form an image in the imaging unit 104 without deflecting the optical path of light coming through the objective lens 3.

The configuration of the microscope system 101 other than the camera head 102 described above is the same as that of the microscope system 1 according to the first embodiment.

With regard to the camera head 102, it is needless to say that attachment thereof to an inverted frame is possible.

According to the fourth embodiment of the present invention described above, it is possible to easily switch to an optimum observation state according to the observation direction and the size of a specimen while maintaining accuracy in imaging and measurement as in the first embodiment described above.

Moreover, according to the fourth embodiment, since the camera head does not include a zoom optical system, the optical path of light passing through the objective lens can be caused to reach the imaging unit without being deflected, and therefore, the configuration becomes simple.

The embodiments of the present invention have been described hitherto, however, the invention is not limited only to the four embodiments described above. In the invention, for example, a light source for illumination and an optical system in which a specimen is irradiated by the light source may not be provided in the camera head.

In addition, in the invention, the frame attachment unit of the camera head may form a female type dovetail groove, and meanwhile, the camera head holding section of the microscope frame may be formed in a male type dovetail shape. In addition, as a slide mechanism formed by the frame attachment unit and the camera head holding section, a known technique other than the technique described herein can be applied.

Furthermore, the terms of "orthogonal" and "parallel" used in the above description includes not only the geometric meanings of "orthogonal" and "parallel", but also the meanings including slight errors.

As such, the present invention can include various embodiments, and the like that are not described herein.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microscope system that generates image data for observation by condensing light from a specimen placed on a stage using an objective lens and capturing an image of the specimen with the condensed light, the microscope system comprising:
   a plurality of microscope frames on each of which the stage is configured to be placed, the microscope frames being different from each other; and
   a camera head to which the objective lens is attachable, the camera head being provided in common for the microscope frames and being attachable to each of the microscope frames by being fitted thereon, and the camera head being slidable with respect to the microscope frame to which it is attached in a direction that is parallel with a surface of the stage placed on the microscope frame to which it is attached,
   wherein the microscope frames include:
      an upright frame that holds the camera head at an upper side of the stage; and
      an inverted frame that holds the camera head at an underside of the stage,
   wherein the upright frame comprises:
      a first arm that is movable in a direction orthogonal to a surface of the stage; and
      a first camera head holding section that is provided in the first arm and holds the camera head;
   wherein the inverted frame comprises:
      a second arm that is movable in the direction orthogonal to the surface of the stage; and
      a second camera head holding section that is provided in the second arm and holds the camera head, and
   wherein the camera head comprises:
      a frame attachment unit that is attachable to the first camera head holding section of the upright frame and to the second camera head holding section of the inverted frame;
      an image-forming optical system configured to form an image with light from the objective lens; and
      an imaging unit configured to capture the image of the specimen to generate the image data.

2. The microscope system according to claim 1, wherein the camera head further comprises a reflective mirror that reflects light passing through the image-forming optical system to deflect an optical path,
   wherein the imaging unit is positioned on the optical path deflected by the reflective mirror and generates the image data by performing photoelectric conversion for light reflected by the reflective mirror, and
   wherein a distance between the image-forming optical system and the reflective mirror is shorter than a distance between the imaging unit and the reflective mirror.

3. The microscope system according to claim 2, further comprising a zoom optical system configured to change a focal length on the optical path between the reflective mirror and the imaging unit.

4. The microscope system according to claim 1, further comprising a symbol information description member that is provided on a side face of the camera head and is rotatable around an axis orthogonal to the side face, wherein the symbol information description member is provided with, on a surface thereof, symbol information that is visually or tactually recognizable by a human being.

5. The microscope system according to claim 1, wherein the first camera head holding section of the upright frame is positioned at a more upper side than the stage and is fitted with the frame attachment unit of the camera head.

6. The microscope system that according to claim 1, wherein the inverted frame comprises a base formed in a rectangular parallelepiped, in which the camera head can be accommodated, and having a sleeve shape in which one side face and the other side face facing the former side face are opened, and and wherein the second camera head holding section is positioned at a more lower side than the stage and holds the camera head so as to be suspended in an inner area that penetrates the base.

7. The microscope system according to claim 6, wherein the base includes:
   two stage placing sections on which at least both end portions of the stage are placeable; and
   recesses that are provided between the two stage placing sections and are formed in a shape dented from top faces of the stage placing sections, the recesses forming an opening in which a part of the camera head can project upward in a state in which the second camera head holding section holds the camera head.

8. The microscope system according to claim 1, wherein the second camera head holding section of the inverted frame is positioned at a more lower side than the stage and is fitted with the frame attachment unit of the camera head.

* * * * *